US011074787B1

(12) United States Patent
Huke et al.

(10) Patent No.: US 11,074,787 B1
(45) Date of Patent: Jul. 27, 2021

(54) ARTIFICIAL INTELLIGENCE AND MACHINE LEARNING ENHANCED BETTING ODDS METHOD, SYSTEM, AND APPARATUS

(71) Applicant: AdrenalineIP, Washington, DC (US)

(72) Inventors: Casey Alexander Huke, Washington, DC (US); John Cronin, Jericho, VT (US); Joseph Bodkin, Quincy, MA (US); Harrison Grant, Anaheim, CA (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/079,849

(22) Filed: Oct. 26, 2020

Related U.S. Application Data

(60) Provisional application No. 62/958,802, filed on Jan. 9, 2020.

(51) Int. Cl.
| | |
|---|---|
| *G07F 17/32* | (2006.01) |
| *G06F 16/23* | (2019.01) |
| *G06N 20/00* | (2019.01) |
| *G06F 17/15* | (2006.01) |
| *G06Q 50/34* | (2012.01) |
| *G06Q 40/02* | (2012.01) |

(52) U.S. Cl.
CPC ...... *G07F 17/3288* (2013.01); *G06F 16/2379* (2019.01); *G06F 17/15* (2013.01); *G06N 20/00* (2019.01); *G06Q 50/34* (2013.01); *G07F 17/323* (2013.01); *G06Q 40/02* (2013.01)

(58) Field of Classification Search
CPC .............. G07F 17/3288; G07F 17/323; G06F 16/2379; G06F 17/15; G06N 20/00; G06Q 50/34
See application file for complete search history.

(56) References Cited

U.S. PATENT DOCUMENTS

2009/0149233 A1* 6/2009 Strause ............... G07F 17/3225
463/7

OTHER PUBLICATIONS siwei-xu_jasmine.pdf, Jasmine Siwei Xu, "Online Sports Gambling: A Look Into the Efficiency of Bookmakers' Odds as Forecasts in the Case of English Premier League", https://www.econ.berkeley.edu/sites/default/files/siwei-xu_jasmine.pdf, University of California, Berkeley, May 2011 (Year: 2011).*
1212.2129.pdf, Bin Li and Steven C. H. Hoi, "Online Portfolio Selection: A Survey", https://arxiv.org/pdf/1212.2129.pdf, Nanyang Technological University, Singapore, 2012 (Year: 2012).*
S1_Appendix.pdf, Birk Diedenhofen, Jochen Musch, "cocor: A Comprehensive Solution for the Statistical Comparison of Correlations", Published: Apr. 2, 2015, https://doi.org/10.1371/journal.pone.0121945 (Year: 2015).*

(Continued)

*Primary Examiner* — Yingchuan Zhang
(74) *Attorney, Agent, or Firm* — Maier & Maier, PLLC

(57) ABSTRACT

Embodiments include utilizing artificial intelligence and/or machine learning to produce sports analytics based on historical score data for specific teams, players, events, or other relevant data. Machine learning can be applied to the historical data in order to improve the betting odds. Correlations between event outcomes and available parameters can be analyzed in advance and in real time by an odds module to give accurate and up-to-date odds.

13 Claims, 6 Drawing Sheets

(56) References Cited

OTHER PUBLICATIONS

CompareCorrCoeff.pdf, Karl L. Wuensch, "Comparing Correlation Coefficients, Slopes, and Intercepts", 2019, http://core.ecu.edu/psyc/wuenschk/docs30/CompareCorrCoeff.pdf (Year: 2019).*

Notification of Transmittal of the International Search Report and the Written Opinion of the International Searching Authority dated Feb. 26, 2021, in connection with corresponding international Application No. PCT/US2021/012038 (11 pp.).

* cited by examiner

| Action ID | Result Data |||||| Situational Data ||||
| | Offensive Team | Offensive Players | Quarter | Down | Distance | Result | Action ID | Team | Players | Quarter | Down | Distance |
| --- | --- | --- | --- | --- | --- | --- | --- | --- | --- | --- | --- | --- |
| 130 | Patriots | Tom Brady, ..... | 2nd | 1st | 10 | Pass | 131 | Patriots | Tom Brady ... | 2nd | 2nd | 5 |
| ... | ... | ... | ... | ... | ... | ... | ... | ... | ... | ... | ... | ... |
| ... | ... | ... | ... | ... | ... | ... | ... | ... | ... | ... | ... | ... |

| Situational Data | | | | | | | Parameters | | | |
|---|---|---|---|---|---|---|---|---|---|---|
| Action ID | Team | Players | Quarter | Down | Distance | Event | Yards Gained | Temperature | Decibel Level | Players |
| 65 | Patriots | Tom Brady,.... | 2nd | 2nd | 5 | Run | 4 | 72 | 82 | Tom Brady,.... |
| 73 | Patriots | Tom Brady,.... | 2nd | 2nd | 5 | Pass | 8 | 34 | 114 | Tom Brady,.... |
| 94 | Patriots | Tom Brady,.... | 2nd | 2nd | 5 | Pass | 7 | 61 | 97 | Tom Brady,.... |
| 114 | Patriots | Tom Brady,.... | 2nd | 2nd | 5 | Run | 3 | 49 | 103 | Tom Brady,.... |
| ---- | ---- | ---- | ---- | ---- | ---- | ---- | ---- | ---- | ---- | ---- |
| ---- | ---- | ---- | ---- | ---- | ---- | ---- | ---- | ---- | ---- | ---- |

| Difference in Correlations | Odds Adjustment |
|---|---|
| + 0-2 | 5% increase |
| - 0-2 | 5% decrease |
| + 3-5 | 10% increase |
| - 3-5 | 10% decrease |
| + 6-8 | 15% increase |
| - 6-8 | 15% decrease |
| --- | --- |
| --- | --- |
| --- | --- |

Fig. 8

| Wager ID | Event | Time | Quarter | Wager | Odds |
|---|---|---|---|---|---|
| 201 | Patriots Vs. Jets | 13:52 | 2nd | Patriots Pass | -115 |
| 202 | Patriots Vs. Jets | 13:52 | 2nd | Patriots Run | -105 |
| 203 | Patriots Vs. Jets | 13:52 | 2nd | Patriots Run Over 3 yards | -125 |
| 204 | Patriots Vs. Jets | 13:52 | 2nd | Patriots Run Under 3 yards | +150 |
| 205 | Patriots Vs. Jets | 13:52 | 2nd | Patriots Pass Over 8 yards | +200 |
| 206 | Patriots Vs. Jets | 13:52 | 2nd | Patriots Pass Under 8 yards | -115 |
| --- | --- | --- | --- | --- | --- |
| --- | --- | --- | --- | --- | --- |
| --- | --- | --- | --- | --- | --- |

Fig. 9

| Wager ID | Adjustment |
|---|---|
| 201 | 5% increase |
| 202 | 5% decrease |
| --- | --- |
| --- | --- |

ARTIFICIAL INTELLIGENCE AND MACHINE LEARNING ENHANCED BETTING ODDS METHOD, SYSTEM, AND APPARATUS

CROSS-REFERENCE TO RELATED APPLICATIONS

This application claims priority to U.S. Provisional Patent Application Ser. No. 62/958,802, filed Jan. 9, 2020, the contents of which are hereby incorporated by reference in their entirety.

FIELD

The embodiments are generally related to sports wagering and artificial intelligence.

BACKGROUND

It is customary for people to wager on games and other sporting events. However, due to the complexity in placing wagers, it is often difficult for users to place wagers on certain aspects of the game outside of its outcome or score. Another problem is that programs that would allow users to place wagers on game events are currently unable to accurately calculate the odds of the next game event. Yet another problem is that inaccurate odds lead to inherent unfairness in wagering which has a negative effect on user retention.

SUMMARY

A method, system, and apparatus for generating odds, for example for use in a wagering game, which may be generated or adjusted using machine learning and/or artificial intelligence. One embodiment includes a method for generating and adjusting odds, including receiving statistical information of a live event in real time, storing the results of an action in the live event in a historic action database, filtering data in the historic action database related to situational data that matches upcoming action in the live event, performing correlations on similar historical data related to the situational data that matches upcoming action in the live event, determining a difference between correlated data of the similar historical data and the data that matches the upcoming action in the live event, comparing the difference to a recommendations database, and adjusting wager odds based on the recommendations database.

In another embodiment, a computer implemented method for providing odds adjustment during a live event may be provided. The method can include, executing on a processor the steps of displaying a sports wagering platform; displaying a live event on which wagers can be made; displaying adjusted odds for one or more predictions for a future play, the adjusted odds based on a comparison of situational data in the live event and historical data; and displaying one or more wagers placed on the adjusted odds.

Another embodiment includes a system for adjusting odds of an action in a live event in real time, including a live event database that received data collected from a live event; a historic action database that stores data collected from at least one of one or more previous events and one or more previous actions; an odds module that determines correlations between the data in the live event database and data in the historic action database and compares a difference of determined correlations to a recommendation database, adjusts wager odds based on the comparison of the determined correlations to the recommendations database an adjustment database; and a display that displays the adjusted wager odds.

BRIEF DESCRIPTIONS OF THE DRAWINGS

The accompanying drawings illustrate various embodiments of systems, methods, and embodiments of various other aspects of the embodiments. Any person with ordinary skills in the art can appreciate that the illustrated element boundaries (e.g. boxes, groups of boxes, or other shapes) in the figures represent one example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are provided with reference to the following drawings. The components in the figures are not necessarily to scale, emphasis instead being placed upon illustrating principles.

FIG. 8 illustrates a recommendation database, according to an embodiment.

FIG. 9 illustrates a bet database, according to an embodiment.

FIG. 10 illustrates an adjustment database, according to an embodiment.

DETAILED DESCRIPTION

Figure 1:
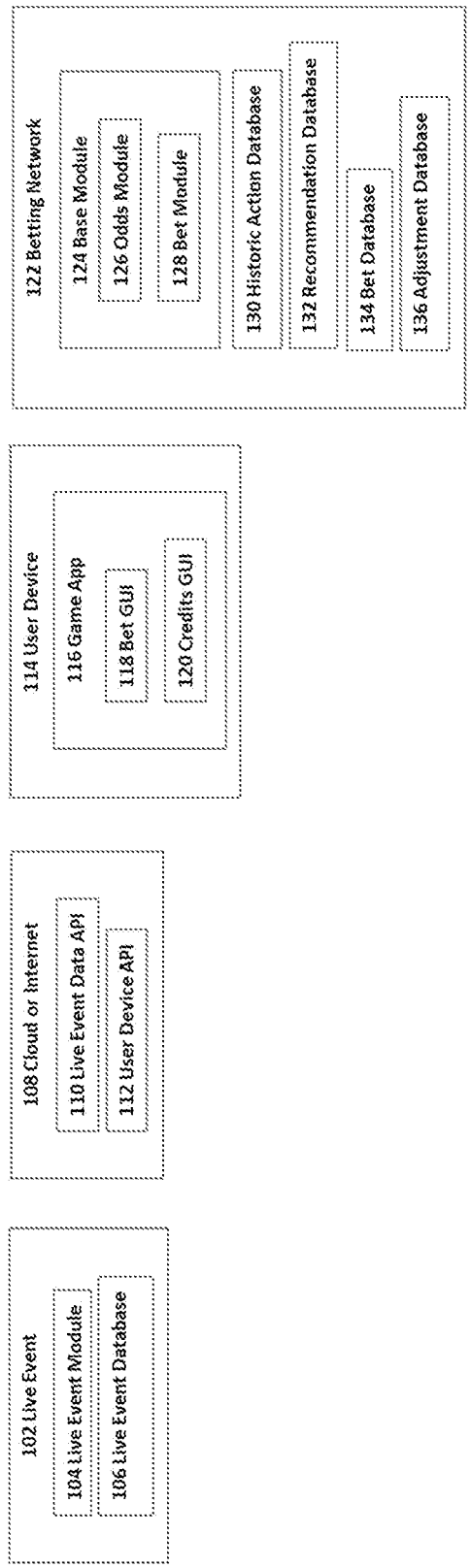
FIG. 1 illustrates an artificial intelligence base live game wager system, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an artificial intelligence based live game wager system. This system includes a live event 102, for example a sporting event such as a football game, basketball game, baseball game, hockey game, tennis match, golf tournament, etc. The live event will include some number of actions or plays, upon which a user or bettor or customer can place a bet or wager, typically through an entity called a sportsbook. There are numerous types of wagers the bettor can make, including, but not limited to, a straight bet, a money line bet, a bet with a point spread or line that bettor's team would need to cover if the result of the game with the same as the point spread the user would not cover the spread, but instead the tie is called a push, and the like. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games that often allow the user to customize their betting by changing the odds and payouts they receive on a wager. Certain sportsbooks will allow the bettor to buy points, to move the point spread off of the opening line, this will increase the price of the bet, sometimes by increasing the juice, "vig", or hold that the sportsbook takes. Another type of wager the bettor can make is an over/under, in which the user bets over or under a total for the live event, such as the score of American football or the run line in baseball, or a series of actions in the live event. Sportsbooks have an amount of bets they can handle, a limit of wagers they can take on either side of a bet before they will move the line or odds off of the opening line.

Additionally, there are circumstances, such as an injury to an important player, such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half time bets. Additionally, the sportsbook can offer futures bets on live events in the future. Sportsbooks need to offer payment processing services in order to cash out customers. This can be done at kiosks at the live event or at another location.

Further, a live action input module 104 receives data about each individual action in a game or match and stores the data in the live event database 106, which is sent to the betting network base module 124. In some embodiments, an action may be a specific play or specific event in a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem length, and the like. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, and the like. A live event database 106 may be provided, which stores data collected by the live event module 104 such as the results of the action that has just occurred as well as the situational data for the next upcoming action. A cloud 108 or communication network may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques, as desired. The communication network may allow ubiquitous access to shared pools of configurable system resources and higher-level services that can be rapidly provisioned with minimal management effort, often over internet and relies on sharing of resources to achieve coherence and economies of scale, like a public utility, while third-party clouds enable organizations to focus on their core businesses instead of expending resources on computer infrastructure and maintenance, at step 108. A live event data API 110 delivers data from the live event to the betting network 122. A user device API 112 delivers data between the betting network and the user device. A user device 114 can connect to the cloud or internet and running the game app 116.

A user device 114 may be a computing device, laptop, smartphone, tablet, computer, smart speaker, or I/O device. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT®, Nintendo Wiimote® for the WIT, Nintendo® WII U GAMEPAD®, or Apple IPHONE®. Some devices allow gesture recognition inputs through combining some of the inputs and outputs. Some devices provide for facial recognition which may be utilized as an input for different purposes including authentication and other commands. Some devices provides for voice recognition and inputs, including, e.g., Microsoft KINECT®, SIRI® for IPHONE by Apple, Google Now or Google Voice Search, and the like.

Additional devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE® or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fibre Channel bus, or a Thunderbolt bus. The user device can leverage the sensors in for purposes such as automatic content recognition, augmented reality or the synchronization of screens between the user device interface and other displays. A game app 116 can display the odds for the next action of the live game, allow the user to place a bet, and display the user's credits. A bet GUI 118, or guided user interface or graphical user interface, can display the possible betting options and odds for each betting option, and the odds determine the ratio of credits bet to credits won or credits lost depending on the outcome of the wager. The interface(s) may either accept inputs from users or provide outputs to the users or may perform both the actions. In one case, a user can interact with the interface(s) using one or more user-interactive objects and devices. The user-interactive objects and devices may include user input buttons, switches, knobs, levers, keys, trackballs, touchpads, cameras, microphones, motion sensors, heat sensors, inertial sensors, touch sensors, virtual reality, augmented reality, eye tracking, or a combination of the above. Further, the interface(s) may either be implemented as a command line interface (CLI), a graphical user interface, a voice interface, or a web-based user-interface. A credits GUI 120, or guided user interface, displays the user's current amount of credits in the credit database, winning bets will increase the user's amount of credits while losing bets will decrease the user's amount of credits, credits may be tied to a real money value. A betting network 122 provides an artificial intelligence based software module that compares data from the live event to data in a historic action database 130 in order to calculate odds of the next action in the live game in order to optimize the amount of bets from the users. A betting network may be located on a server which may perform real time analysis on the type of play and the result of a play or action. The server, or cloud, may also be synchronized with game situational data, such as the time of the game, the score, location on the field, weather conditions, and the like, which may affect the choice of play utilized. For example, in other exemplary embodiments, the server may not receive data gathered from sensors and may, instead, receive data from an alternative data feed, such as Sports Radar. This data may be provided following the completion of any play and the data from this feed may be compared with a variety of team data and league data based on a variety of elements, including down, possession, score, time, team, and so forth, as described in various exemplary embodiments herein. The server can offer a number of software as a service (SaaS) managed services such as, user interface service, risk management service, compliance, pricing and trading service, IT support of the technology platform, business applications, game configuration, state based integration, fantasy sports connection, integration to allow the joining of social media, as well as marketing support services that can provide engaging promotions to the user, at step 122. A base module 124 which receives the live event database 106 from the live event module 104, which contains historical and situational data on a live event currently occurring. The base module 124 stores the historical data in the historic action database 130 and sends the situational data to the odds module 126 and initiates the odds module 126. An odds module 126 uses the situational data from the live event to filter the historic action database 130 on previous actions with some the same situational data and performs correlations on the similar actions in order to determine the difference in the correlations and compare the difference in correlations to the recommendation database 132 in order to adjust the wager odds within the bet database 134 accordingly. A bet module 128 compares the bet database 134 to the adjustment database 136 in order to determine if there is a match in the wager IDs. Then, if there is a match, then the wager odds are adjusted accordingly, by bet module 128. A historic action database 130 stores all the historic actions of an event. A recommendation database 132 is used to determine the appropriate adjustment in the wager odds by using the difference in the correlated data from the odds module 126. A bet database contains the current options that users can place a wager on. An adjustment database stores the wager ID and the appropriate adjustment, for example increase by 5% or decrease by 5%, needed for the specific wager.

Figure 2:
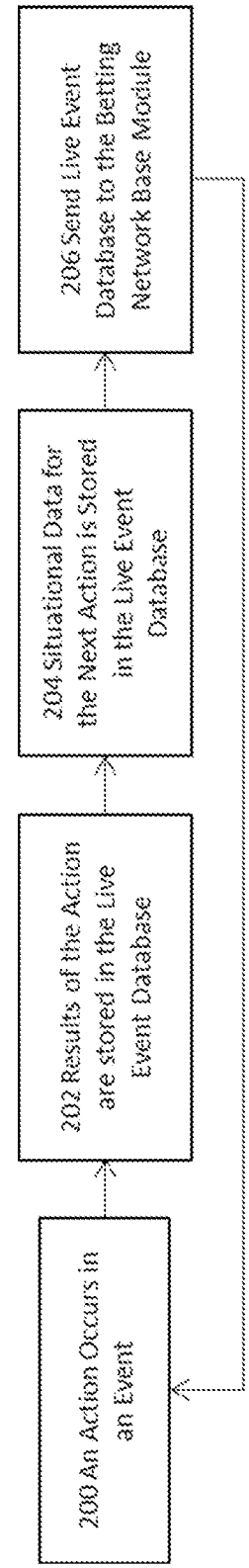
FIG. 2 illustrates a live event module, according to an embodiment.

FIG. 2 provides an illustration of the live event module 104. The process begins with an action, for example a play, that occurs in an event, such as a sporting event, at step 200. The live event module 104 then stores the results of the action in the live event database, at step 202. The live event module 104 also stores situational data in the live event database 106 which is information for the upcoming action in an event, at step 204. The live event module 104 then sends the live event database 106 to the betting network 122 base module 124 and the process returns to step 200, at step 206.

Figures 3, 4:
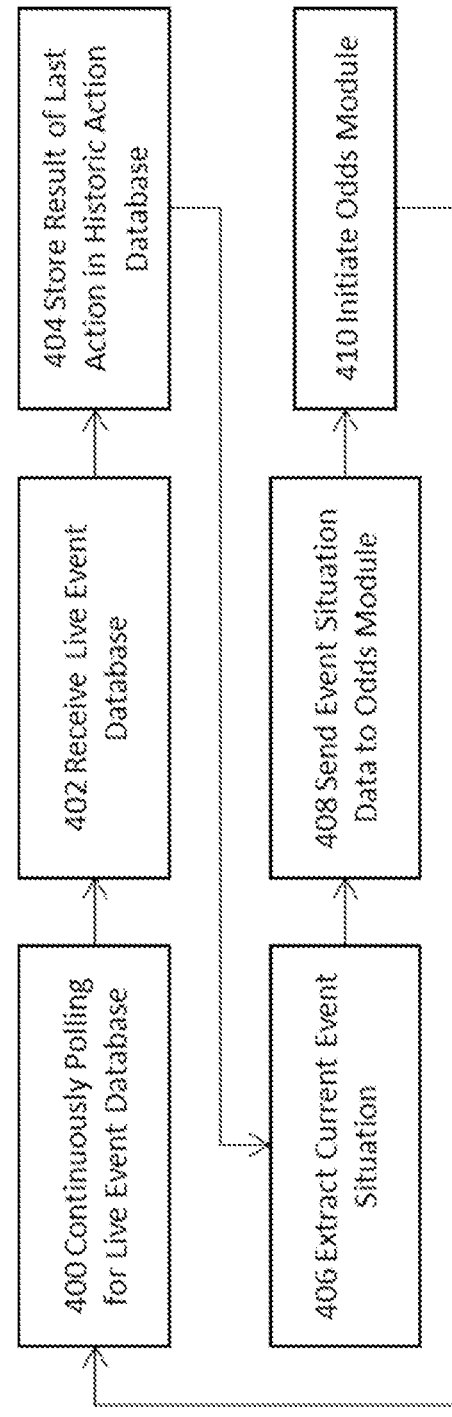
FIG. 3 illustrates a live event database, according to an embodiment.
FIG. 4 illustrates a base module, according to an embodiment.

FIG. 3 provides an illustration of the live event database 106 which contains information on the live event, such as results of the last action and information for the upcoming action. The live event database 106 may contain result data such as the action ID, offensive team, offensive players, quarter or time period of the event, down, distance and result of the action such as a pass. In some embodiments, the result data may contain statistical information for offensive, defensive teams, or special teams, players, or coaches. The live event database 106 also contains situational data or information for the upcoming action in a live event. The situational data may include the action ID, offensive team, offensive players, quarter or time period of the event, down and distance. In some embodiments, the live event database 106 may contain information regarding the defensive team or players, individual coaches, location of the event, temperature, levels of precipitation, type of precipitation, time of the event, referees or officials of the event, color of the uniforms for each team, at step 300. In some embodiments the live event database 106 may be a "sportsbook", "casino", "racino", or kiosk.

FIG. 4 provides an illustration of the base module 124. The process begins with the base module 124 continuously polling for the live event database 106 from the live event module 104, at step 400. The base module 124 receives the live event database 106, at step 402. The base module 124 stores the results data, or the results of the last action, in the historic action database 130 which contains historical data of all previous actions, at step 404. The situational data from the live event database 106 is extracted, at step 406. The extracted situational data from the live event database 106 is sent to the odds module 126, at step 408. The odds module 126 is initiated, and the process returns to continuously polling for the live event database 106, at step 410.

Figure 5:
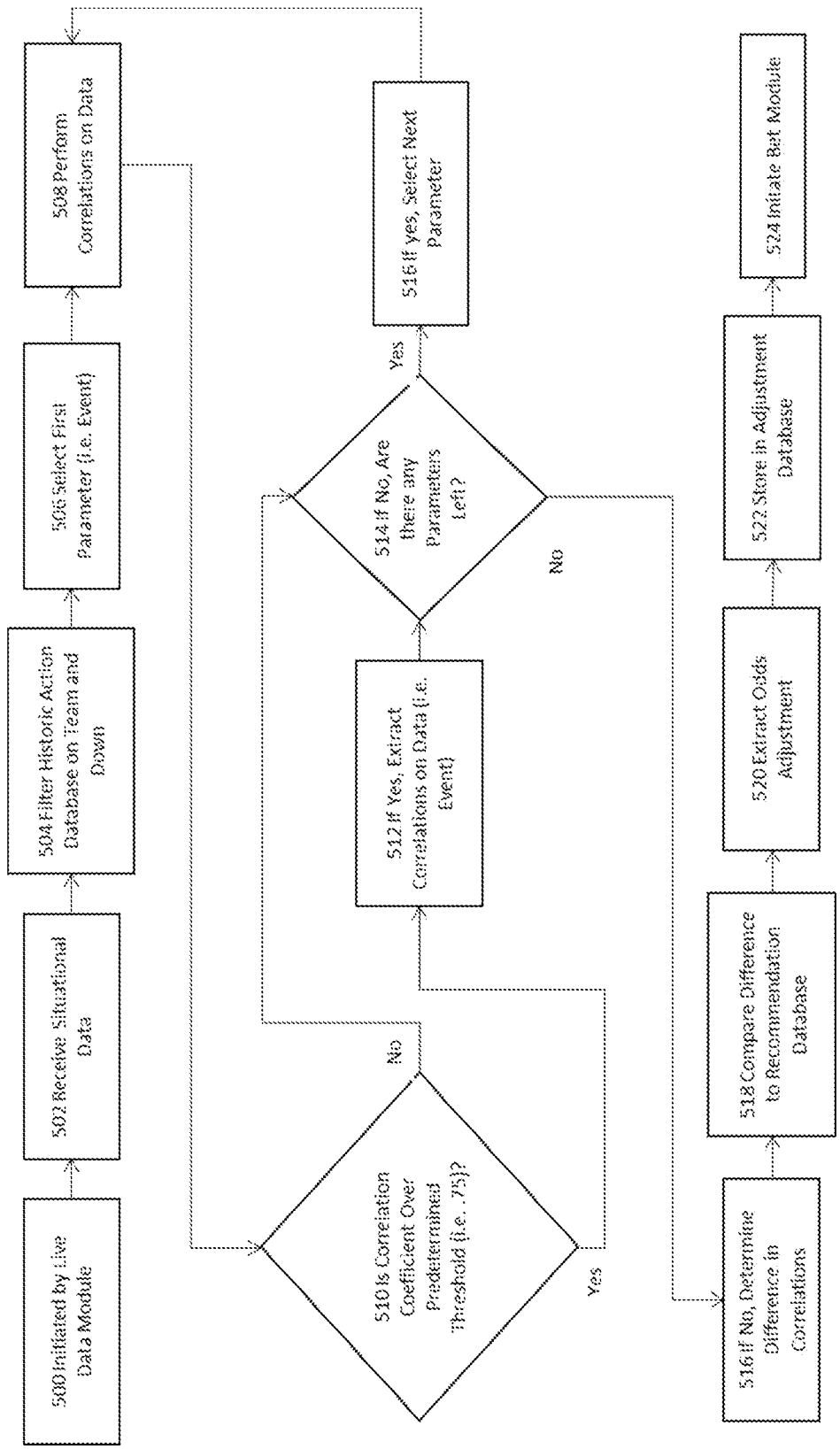
FIG. 5 illustrates an odds module, according to an embodiment.
Figure 11B:
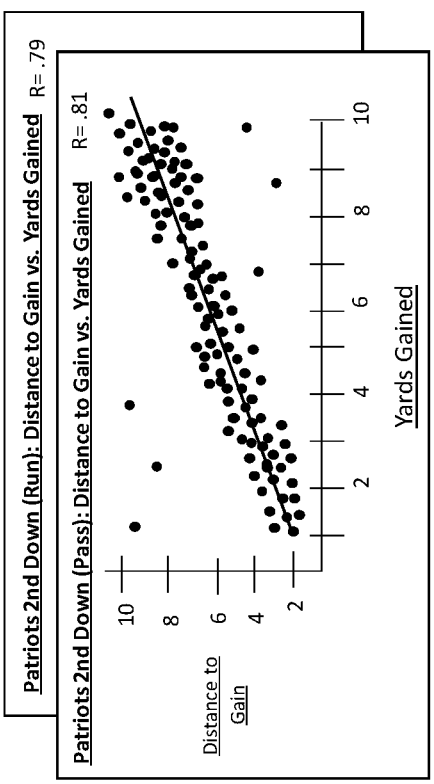
FIG. 11B illustrates an example of an odds module, according to an embodiment.

FIG. 5 provides an illustration of the odds module 126. The process begins with the odds module 126 being initiated by the base module 124, at step 500. The odds module 126 receives the situational data, or information about the upcoming action or action in an event, from the base module 124, at step 502. The odds module 126 filters the historic action database 130 on the team and down from the situational data, at step 504. The first parameter of the historic action database 130 is selected, for example the event, at step 506. Then the odds module 126 performs correlations on the data. For example, the historical action database 130 is filtered on the team, the players, the quarter, the down and the distance to be gained. The first parameter is selected which in this example is the event, which may either be a pass, or a run and the historical action database 130 is filtered on the event being a pass. Then, correlations are performed on the rest of the parameters, which are yards gained, temperature, decibel level, etc. In FIG. 11B, the graph shows the correlated data for the historical data involving the Patriots in the second quarter on second down with five yards to go and the action being a pass, which has a correlation coefficient of 0.81. The correlations are also performed with the same filters and the next event which is the action being a run which is also shown in FIG. 11B and has a correlation coefficient of 0.79, at step 508. It is determined if the correlation coefficient is above a predetermined threshold, for example 0.75, in order to determine if the data is highly correlated and deemed a relevant correlation, at step 510. If the correlation is deemed highly relevant, then the correlation coefficient is extracted from the date. For example, the two correlation coefficients of 0.81 for a pass and 0.79 for a run are both extracted, at step 512. If it is determined that the correlations are not highly relevant, then then it is determined if there are any parameters remaining. Also, if the correlations were determined to be highly relevant therefor extracted It is also determined if there are any parameters remaining to perform correlations on, at step 514. If there are additional parameters to have correlations performed then the odds module selects the next parameter in the historic action database and returns to step 508, at step 516. Once there are no more remaining parameters to perform correlations on, the odds module then determines the difference between each of the extracted correlations. For example, the correlation coefficient for a pass is 0.81 and the correlation coefficient for a run is 0.79. The difference between the two correlation coefficients (0.81–0.79) is 0.02. In some embodiments, the difference may be calculated by using subtraction on the two correlation coefficients. In some embodiments, the two correlation coefficients may be compared by determining the statistical significance. The statistical significance, in an embodiment, can be determined by using the following formula: Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved may be used instead of the difference of the correlation coefficients in the recommendation database 132 to compare the two correlation coefficient based on statistical significance as opposed to the difference of the two correlation coefficients, at step 516. The difference between the two correlation coefficients, 0.02, is then compared to the recommendation database 132. The recommendation database 132 contains various ranges of differences in correlations as well as the corresponding odds adjustment for those ranges. For example, the 0.02 difference of the two correlation coefficients falls into the range +0-2 difference in correlations which according to the recommendation database 132 should have an odds adjustment of 5% increase, at step 518. The odds module 126 then extracts the odds adjustment from the recommendation database 132, at step 520. The extracted odds adjustment is stored in the adjustment database 136, at step 522. Then odds module 126 initiates the bet module 128, at step 524.

In other embodiments, it may be appreciated that the previous formula may be varied depending on a variety of reasons, for example adjusting odds based on further factors or wagers, adjusting odds based on changing conditions or additional variables, or based on a desire to change wagering action. Additionally, in other example embodiments, one or more alternative equations may be utilized in the odds module 126. One such equation could be Zobserved=(z1−z2)/(square root of [(1/N1−3)+(1/N2−3)]), where z1 is the correlation coefficient of the first dataset, z2 is the correlation coefficient of the second dataset, N1 is the sample size of the first dataset, and N2 is the sample size of the second dataset, and the resulting Zobserved to compare the two correlation coefficient based on statistical significance as opposed to the difference of the two correlation coefficients. Another equation used may be $Z=b_1-b_2/S_{b1-b2}$ to compare the slopes of the datasets or may introduce any of a variety of additional variables, such as $b_1$ is the slope of the first dataset, $b_2$ is the slope for the second dataset, $S_{b1-b2}$ is the standard error for the slope of the first dataset minus the standard error for the slope of the second dataset. The results of calculations made by such equations may then be compared to the recommendation data 132 and the odds module 126 may then extract an odds adjustment from the recommendation database 132. The extracted odds adjustment is then stored in the adjustment database 136 and the bet module 128 is initiated by the odds module 126, as in the above.

It can be noted that the odds module 126 can be made available for access, reconfiguration, modification, or control for customers or used for managed service user interface service, managed service risk management services, managed service compliance service, managed service pricing and trading service, managed service and technology platform, managed service and marketing support services, payment processing services, business applications, engaging promotions, "customized betting", business applications, state based integration, game configurator, "fantasy sports connector", software as a service, synchronization of screens, automatic content recognition (ACR), joining social media, Augmented reality, digital gaming, "eSports" or for users to "cash out".

Figures 6, 7:
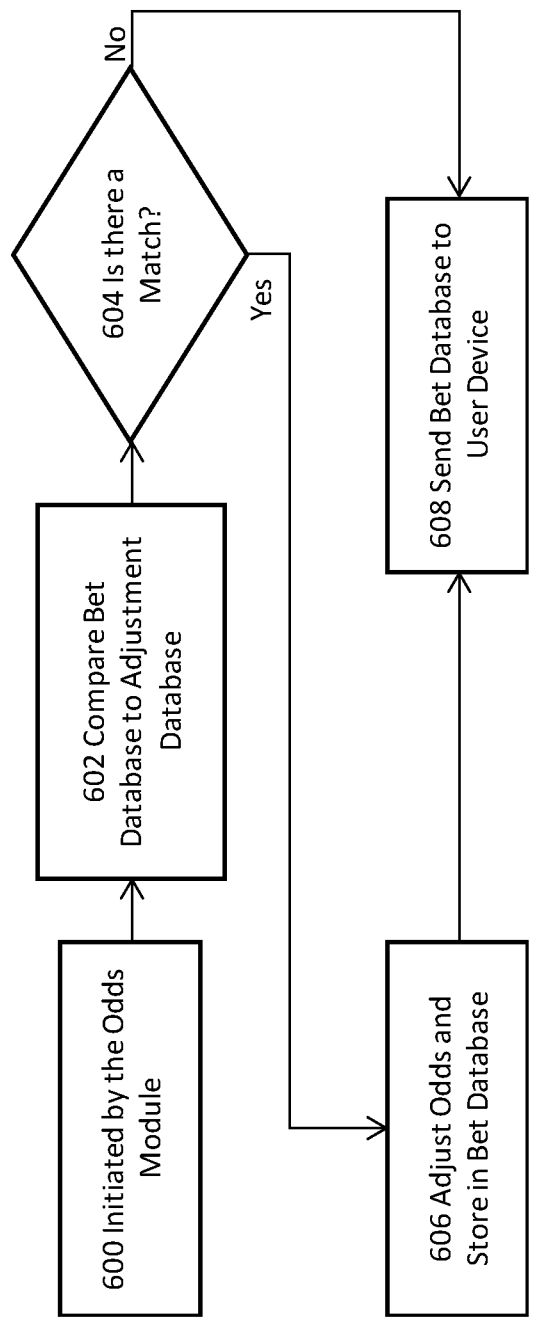
FIG. 6 illustrates a bet module, according to an embodiment.
FIG. 7 illustrates a historic action database, according to an embodiment.

FIG. 6 provides an illustration of the bet module 128. The process begins with the bet module 128 being initiated by the odds module 126, at step 600. The bet module 128 compares the bet database 134 to the adjustment database 136, at step 602. It is determined whether or not there is a match in any of the wager ID's in the bet database 134 and the adjustment database 136. For example, the bet database 134 contains a list of the all the current bet options for a user which, for each bet option, the bet database 134 contains a wager ID, event, time, quarter, wager, and odds. The adjustment database 136 contains the wager ID and the percentage, either as an increase or decrease, that the odds should be adjusted. If there is a match between the bet database 134 and the adjustment database 136, then the odds in the bet database 134 are adjusted by percentage increase or decrease in the adjustment database 136 and the odds in the bet database 134 are updated. For example, if the odds in the bet database 134 are −105 and the matched wager ID in the adjustment database 136 is a 5% increase, then the updated odds in the bet database 134 should be −110, at step 604. If there is a match, then the odds are adjusted based on the data stored in the adjustment database 136 and the new data is stored in the bet database 134 over the old entry, at step 606. If there are no matches, or, once the bet database 134 has been adjusted if there are matches, the bet module 128 sends the bet database 134 to the user device 114, allowing users to place bets on the wagers stored in the bet database 134, at step 608.

FIG. 7 provides an illustration for the historic action database 130, which is created via the base module storing the results from the live event database 106. The historic action database 130 contains situational data such as the action ID, the team, the players, the quarter, the down, and the distance. The historic action database 130 also contains parameters such as the event, yards gained, temperature, decibel level, and players. It should be noted that the historic action database 130, in an embodiment, is used for the purpose of a working example for football, but can also be implemented for any other sport or event, as desired. The historic action database 130 may contain situational data and parameters for various events or sporting events such as football, basketball, baseball, hockey, soccer, rugby, golf, tennis, etc. The situational data is information about actions such as the statistical information for teams or individuals competing in an event, the time period of the event, and information leading up to the upcoming action, for example, in the current lead or deficit for a team or player, the location of a certain player or players on the event field, court, or pitch, etc. In some embodiments, the situational data may be information related to sensor data related to individual players, teams, or sensor data retrieve from wearable devices or equipment such as balls, protective equipment, clubs, bats, etc. The parameters would be the information containing the results of the situational data which would be the statistical data that resulted from the action related to the situational data, in FIG. 7.

FIG. 8 provides an illustration for the recommendations database 132 which is used in the odds module to determine how the wager odds should be adjusted depending on the difference between the correlation coefficients of the correlated data points. The recommendations database 132 may contain the difference in correlations and the odds adjustment. For example, in FIG. 11B there is a correlation coefficient for a Patriots $2^{nd}$ down pass of 0.81 and a correlation coefficient for a Patriots $2^{nd}$ run of 0.79, the difference between the two would be +0.02 when compared to the recommendation database 132 the odds adjustment would be a 5% increase for a Patriots pass or otherwise identified as wager 201 in the adjustment database 136. In some embodiments, the difference in correlations may be the statistical significance of comparing the two correlation coefficients in order to determine how the odds should be adjusted.

FIG. 9 provides an illustration for the bet database 134 contains the potential bets or wagers that users can place on the event and is updated via the odds module and the bet module depending on the resulting correlation coefficients. The bet database 134 contains the wager ID, the event, the time, the quarter, the wager, and the odds. It should be noted that the bet database 134 is currently constructed to provide a working example using football as the event, but the bet database 134 would be constructed based on a sport by sport basis. Other examples of bet data stored in the bet database may be "wager", "buy points", "price", "no action", "sides", "longshot", "opening line", "favorite", "chalk", "circled game", "laying the points price", "dog", "underdog", "money line", "straight bet", "straight-up", "line", "cover the spread", "cover", "tie", "pick", "pick-em", "middle", "parlay", "round robin", "teaser", "prop bet", "first-half-bet", "half-time-bet", "listed pitchers", "run line", "futures bet", "future", "handle", "juice", "vigorish", "off the board" or customized betting. In some embodiments, the data in the bet database may be received or sent to "sportsbooks", "casinos", "racinos", or kiosks.

FIG. 10 provides an illustration for the adjustment database 136 is used to adjust the wager odds of the bet database 134, if it is determined that a wager should be adjusted. The adjustment database 136 contains the wager ID, which is used to match the with the bet database 134 to adjust the odds of the correct wager.

Figure 11A:
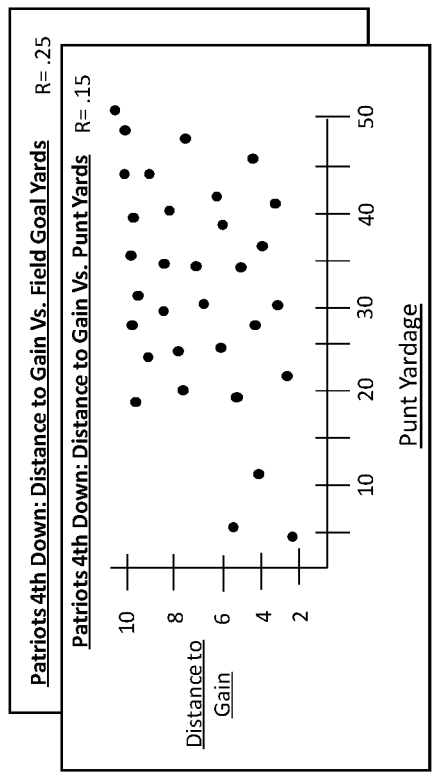
FIG. 11A illustrates an example of an odds module, according to an embodiment.

FIG. 11A provides an illustration of an example of the odds module and the resulting correlations. In FIG. 11A, the data is filtered by the team, down and quarter and finding the various correlations with the team, down and quarter and the various parameters such as the yards to gain, punt yardage, field goal yardage, etc. An example of non-correlated parameters with the team, down, and quarter and the yards to gain and punt yardage with a 15% (which is below the 75% threshold), therefore there is no correlation and the next parameters should be correlated, unless there are no more parameters remaining.

FIG. 11B provides an illustration of an example of the odds module and the resulting correlations. In FIG. 11B, the data is filtered by the team, down and quarter and finding the various correlations with the team, down and quarter and the various parameters such as the event, yards to gain, yards gained, etc. An example of correlated parameters is with the event being a pass and the team, down, and quarter with an 81%, therefore there is a correlation (since it is above the 75% threshold) and the correlation coefficient needs to be extracted and compared with the other extracted correlation coefficient which in this example is the event data where the event is a run, which is correlated at 79%. The difference of the two correlations are compared to the recommendations database in order to determine if there is a need to adjust the odds. In this example, there is a 0.02 difference between the event being a pass and the event being a run, which means on second down in the second quarter the New England Patriots are slightly more likely to throw a pass than to run the ball and the odds are adjusted 5% decrease in order to match the correlated data. Conversely, if the correlated data of run, 0.79 is compared to the correlated data of a pass, 0.81, then the difference would be −0.02 and the odds would be adjusted by 5% increase, at step 1104.

Figure 12B:
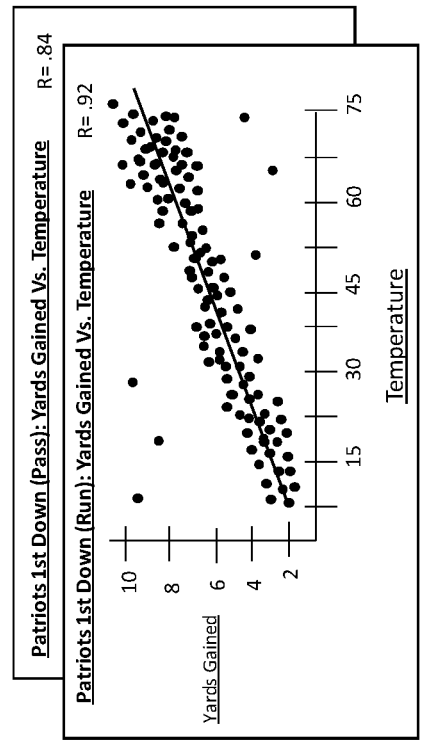
FIG. 12B illustrates another example of an odds module, according to an embodiment.
Figure 12A:
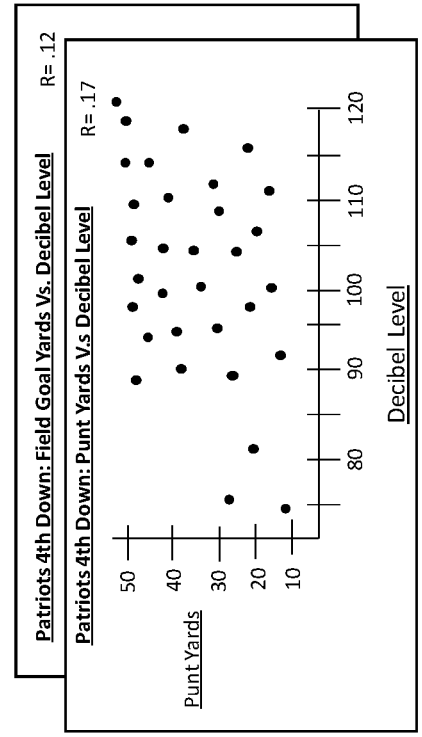
FIG. 12A illustrates another example of an odds module, according to an embodiment.

FIG. 12A provides an illustration for another example of the odds module and the resulting correlations. In FIG. 12A, the data that is filtered by the team, down and quarter and finding the various correlations with the team, down and quarter and the various parameters such as the decibel level in the stadium, punt yardage, field goal yardage, etc. An example of non-correlated parameters with the team, down, and quarter and the decibel level in the stadium and punt yardage with a 17% (which is below the 75% threshold), therefore there is no correlation and the next parameters should be correlated, unless there are no more parameters remaining.

FIG. 12B provides an illustration for another example of the odds module and the resulting correlations. In FIG. 12B, the data that is filtered by the team, down and quarter and finding the various correlations with the team, down and quarter and the various parameters such as the event, temperature, yards gained, etc. An example of correlated parameters is with the event being a run and the team, down, and quarter with an 92%, therefore there is a correlation (since it is above the 75% threshold) and the correlation coefficient needs to be extracted and compared with the other extracted correlation coefficient which in this example is the event data where the event is a pass, which is correlated at 84%. The difference of the two correlations are compared to the recommendations database in order to determine if there is a need to adjust the odds. In this example, there is a 0.08 difference between the event being a run and the event being a pass, which means on first down in the first quarter the New England Patriots are more likely to throw a run than to pass the ball and the odds are adjusted 15% decrease in order to match the correlated data. Conversely, if the correlated data of run, 0.84 is compared to the correlated data of a pass, 0.92, then the difference would be −0.08 and the odds would be adjusted by 15% increase.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for generating and adjusting odds, comprising:
   receiving statistical information of a live event in real time,
   storing the results of an action in the live event in a historic action database immediately following the occurrence of the action in the live event,
   filtering live event data in the historic action database related to situational data in the live event that matches upcoming action in the live event,
   performing correlations on similar historical data related to the situational data that matches upcoming action in the live event,
   determining a difference between correlated data of the similar historical data and the data that matches the upcoming action in the live event,
   comparing the difference to a recommendations database,
   adjusting wager odds based on the recommendations database to provide a wager on a wagering device at a threshold time before a future action in the live event; and
   outputting the adjusted wager odds to a gaming device such that a wager can be placed before the future action in the live event.

2. The method for generating and adjusting odds of claim 1, further comprising determining if the correlations performed are relevant by calculating one or more correlation coefficients and comparing the one or more correlation coefficients to a predetermined threshold.

3. The method for generating and adjusting odds of claim 2, further comprising determining if the correlations performed are relevant with the formula: Zobserved=(z1−z2)/(square root of [(1/N1−3)+(1/N2−3)]), where z1 is a correlation coefficient of a first dataset, z2 is a correlation coefficient of a second dataset, N1 is a sample size of the first dataset, N2 is a sample size of the second dataset, and Zobserved is used in the recommendation database as a comparison between z1 and z2 based on statistical significance.

4. The method for generating and adjusting odds of claim 2, further comprising determining if the correlations performed are relevant with the formula: $Z=b_1-b_2/S_{b1-b2}$ that compares slopes of datasets and wherein $b_1$ is the slope of the first dataset, $b_2$ is the slope for the second dataset, $S_{b1-b2}$ is the standard error for the slope of the first dataset minus the slope of the second dataset.

5. The method for generating and adjusting odds of claim 1, further comprising determining a number of parameters to perform correlations on.

6. The method for generating and adjusting odds of claim 1, wherein the recommendations database includes a plurality of ranges of differences in correlations and the method further comprises extracting an odds adjustment factor from the recommendations database upon the determination of a difference between two or more correlations and storing the odds adjustment factor in an adjustment database.

7. The method of generating and adjusting odds of claim 1, wherein the historic action database comprises a plurality of historic situational data related to the live event.

8. The method of generating and adjusting odds of claim 1, wherein the historic action database is populated by sensor data acquired during the live event and one or more previous live events.

9. The method of generating and adjusting odds of claim 1, further comprising outputting adjusted wager odds to a bet module having a bet database storing a plurality of betting options and determining one or more bets that are provided based on the adjusted wager odds and one or more bets in the bet database.

10. The method of generating and adjusting odds of claim 9, wherein the live event is a sporting event and further comprising adjusting the wager odds and displaying the adjusted wager odds after the end of a play and before the next play in the live event.

11. A system for adjusting odds of an action in a live event in real time, comprising:
   a live event database that receives data collected from a live event, the data comprising result data from at least one action in the live event;
   a historic action database that stores data collected from at least one of one or more previous events and one or more previous actions;
   an odds module that determines correlations between the data in the live event database and data in the historic action database, compares a difference of determined correlations to a recommendation database, and adjusts wager odds based on the comparison of the determined correlations to the recommendations database; and
   a display that displays the adjusted wager odds prior to the occurrence of a future action that immediately follows the at least one action in the live event.

12. The system of claim 11, further comprising an adjustment database that stores a plurality of predetermined odds adjustment factors.

13. The system of claim 11, further comprising a base module that extracts a current event situation from the live event and transmits data associated with the current event situation to the odds module.

* * * * *